Aug. 8, 1944.  S. B. KURZINA, JR  2,355,308
METHOD OF MAKING BACKPEDALING BRAKES FOR VELOCIPEDES
Filed July 31, 1940
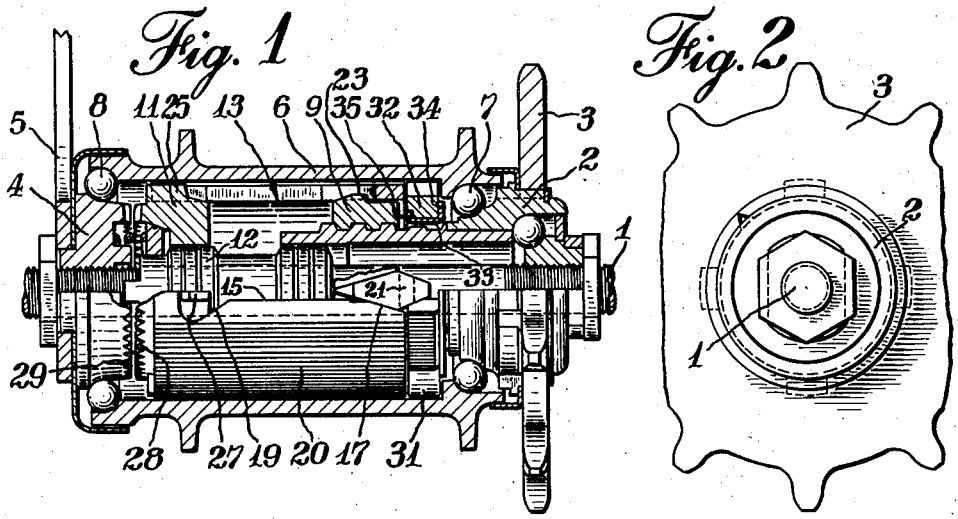
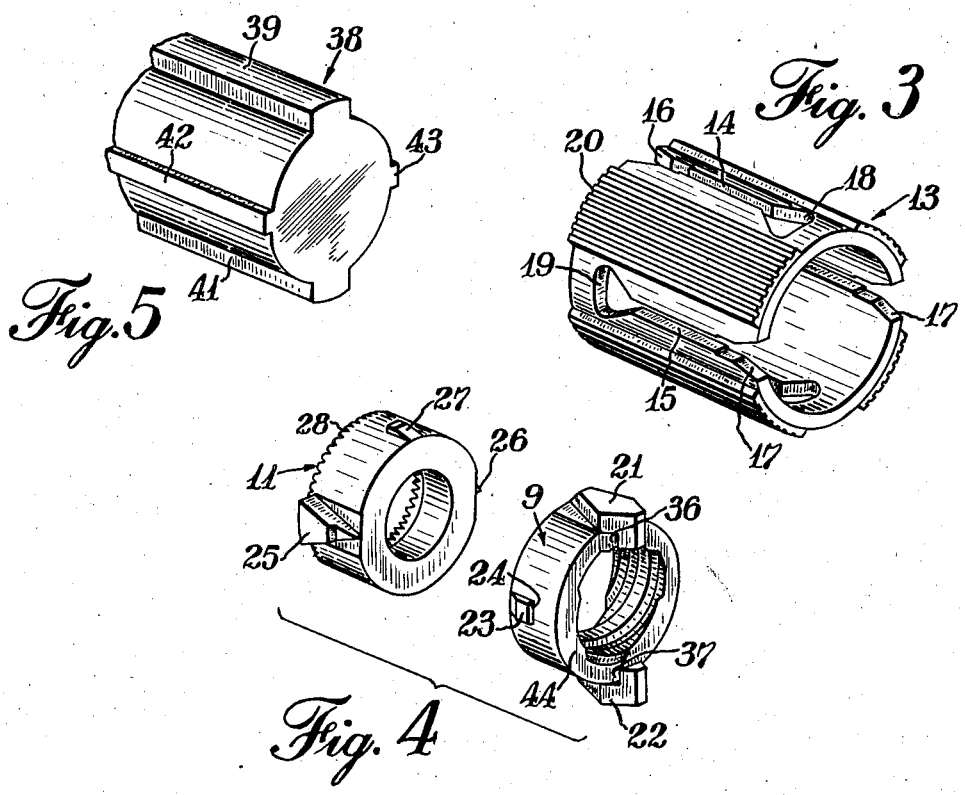
INVENTOR.
Stanley B. Kurzina Jr.
BY
Clinton S. Janes
ATTORNEY Patented Aug. 8, 1944

2,355,308

UNITED STATES PATENT OFFICE 2,355,308

METHOD OF MAKING BACKPEDALING BRAKES FOR VELOCIPEDES

Stanley B. Kurzina, Jr., Elmira, N. Y., assignor to Bendix Aviation Corporation, South Bend, Ind., a corporation of Delaware Application July 31, 1940, Serial No. 348,791

4 Claims. (Cl. 29—152.1)

The present invention relates to a method of manufacturing backpedaling brakes for velocipedes and more particularly to an improved method of manufacturing the actuating structure for such brakes. This application has been divided, application Serial Number 407,426, now Patent Number 2,314,845, having been filed on August 19, 1941, for the purpose of claiming intensively the brake structure as distinguished from the method of manufacture thereof which is claimed in this application.

In that commercial form of backpedaling brake which is based on the teachings of the patent to Morrow No. 906,149, a slotted brake sleeve is expanded within a cylindrical hub by means of wedges entering the slots, while the sleeve is prevented from rotation by being clutched to an anchor member. The brake controlling members as heretofore constructed involve a number of machining operations which render the parts comparatively expensive. Moreover, they are kept in assembled relation with the brake sleeve by means of pins fixed in the controlling members and engaging in the closed ends of the slots in the brake sleeves, and these pins sometimes work loose and score the hub.

It is an object of the present invention to provide a novel method of manufacturing backpedaling hub brakes which is efficient and economical.

It is another object to provide such a method by which the brake controlling members are formed as unitary structures, all the parts of which are formed integrally on the body of the unit.

A further object is to provide such a method by which the brake member is provided with means for cutting through grease or oil in order to come into metal to metal contact with the interior of the hub.

Another object is to provide a novel method of assembly of such brake controlling parts which is rapid and inexpensive.

Further objects and advantages will be apparent from the following description taken in connection with the accompanying drawing in which:

Fig. 1 is a side elevation partly in section and partly broken away showing a hub brake incorporating brake actuating members formed according to a preferred form of the invention;

Fig. 2 is an end view from the right in Fig. 1;

Fig. 3 is a detail in perspective of a brake sleeve formed according to the present invention;

Fig. 4 is a detail in perspective of a pair of brake actuating members formed according to a preferred form of the invention; and Fig. 5 is a detail in perspective of the stock from which the brake actuating members are formed in practicing the present invention.

In Fig. 1 of the drawing there is illustrated a stationary axle 1, on one end of which is adjustably journalled a driving member 2 actuated by a sprocket 3, and on the other end of which is fixedly mounted an anchor member 4 held from rotation by a brake arm 5. A hollow cylindrical hub 6 is journalled on the driving and anchor members by means of bearings 7 and 8. A driving brake expanding member 9 is threaded on the driving member 2, an anchor brake expanding member 11 is journalled on the axle 1 by means of a bearing sleeve 12, and a brake member 13 in the form of a cylinder is mounted at its ends on said expanding members 9 and 11.

Brake sleeve 6 is provided with quadrantally arranged longitudinal overlapping slots 14 and 15, the open ends of which slots are flared as indicated at 16 and 17, and the closed ends of which are enlarged to form pear-shaped openings 18 and 19.

The surfaces between the slots 14 and 15 are arranged to engage in the interior of the hub 6 when the sleeve is expanded in order to apply a frictional braking effect thereto. Preferably, the braking surfaces are somewhat enlarged in diameter and may be formed integrally with the sleeve or by means of brake shoes rigidly attached thereto. As here shown, the braking surfaces are provided with longitudinal ribs 20 having sharp edges adapted to scrape lubricant from the interior of the hub so as to insure a metal to metal surface contact of the brake sleeve with the interior of the hub when the sleeve is expanded.

As best seen in Fig. 4, the driving brake expanding member 9 is provided with a pair of wedge lugs 21 and 22 which are adapted to engage in the flared portions 17 of slots 15 and expand the brake sleeve when the expander is forced into the sleeve. Expander 9 is also provided with beveled lugs 23 adapted to enter the pear-shaped openings 18 of slots 14 in the brake sleeve when the expander member 9 is introduced into the sleeve, the lugs 23 having radial shoulders 24 adapted to engage the base of the pear-shaped openings and retain the expander 9 within the brake sleeve. The height of the lugs 23 is such that the brake sleeve 13 is sprung outward by the tapered surfaces 27 when the expander is placed therein, and when the lugs enter the openings 18, the sleeve snaps down into interlocking engagement therewith.

In like manner, the anchor expander member 11 is provided with diametrically arranged wedge lugs 25 and 26 adapted to engage the flared ends 16 of slots 14, and tapered lugs 27 adapted to engage in the pear-shaped openings 19 to retain the anchor expander member in the sleeve.

The anchor brake expanding member 11 is provided with clutch teeth 28, and the anchor member 4 is provided with corresponding clutch teeth 29. When the driving expander member 9 is moved to the left in Fig. 1 by backward rotation of the driving member to apply the brake, the teeth 28 and 29 are caused to engage, thus immobilizing the anchor expander member 11.

Forward rotation of the driving member 2 is transmitted to the hub by means of a pair of arcuate clutch members 31 and 32 which are expanded into clutching engagement with the interior of the hub 6 by the wedge lugs 21 and 22 on the expander member 9 when forward rotation of the driving member causes said expander member to move to the right in Fig. 1.

Means for holding the clutch members 31, 32 in assembled relation is provided in the form of a ring 33 having radial flanges 34 and 35 embracing the clutch members. Wedge lugs 21 and 22 extend beyond the body of the expander member 9 and are provided with undercut grooves 36 and 37 in which flange 35 of ring 33 engages in order to enforce longitudinal movement of the ring and clutch members with the expander member 9.

According to the present invention, the wedge lugs 21, 22, 25 and 26 and the tapered lugs 23 and 27 of the expander members are formed integrally with the expander members by means of a novel method of manufacture. As shown in Fig. 5, bar stock 38 is provided having an outer diameter suitable for the expander members 9 and 11, said bar stock having oppositely arranged longitudinal ribs 39, 41 projecting therefrom, of a height equal to the thickness of the wedge lugs 21, 22, 25 and 26, the thickness of the ribs being equal to the maximum thickness of the wedge lugs. Spaced ninety degrees from the ribs 39, 41 are a second pair of diametrically arranged longitudinal ribs 42, 43 of a height and thickness equal to the maximum height and thickness of the tapered lugs 23 and 27.

In the manufacture of the driving expander member 9 from said bar stock, the stock is placed in an automatic lathe, whereupon the ends of the ribs are turned off to form a taper, the central hole is drilled, reamed and counterbored, and the recess which forms the undercut grooves 36 and 37 is cut. The work is then cut off and removed from the automatic. Thereafter, milling operations are employed to form the wedge surfaces on the wedges 21 and 22, to mill off the flat ends of the lugs 23 and to form the face 44. The threads are then tapped in the interior of the piece to finish the part.

In manufacturing the anchor expanding member 11, the same stock is employed, and the end is drilled, counterbored and the taper on the lugs and shoulders formed on the automatic. The part is then cut off, the sides of the wedges are milled, the shoulders 27 are milled off to the proper length, and the teeth 28 are also formed by milling operations.

It will be understood that since the formed or extruded stock having the ribs 39, 41 and 42, 43 may be obtained at practically the same cost per pound as ordinary cylindrical bar stock, the use of such extruded stock in the novel method of manufacture herein disclosed, involves a very decided saving in material and manufacturing expense over the cost of manufacturing such parts from cylindrical bar stock.

Although but one form of the invention has been shown and described in detail, it will be understood that other forms are possible and that variations in the steps of manufacture may be employed without departing from the spirit of the invention as defined in the claims appended hereto.

What is claimed is:

1. In a method of manufacture of brake controlling nuts for hub brakes from extruded bar stock having diametrically arranged longitudinal ribs, the steps of turning a taper on the ribs at one end of the stock, drilling, counterboring and forming an interior recess in one end of the stock, milling off the sides of two of the ribs obliquely to form wedge lugs, and turning off the face of the work so as to leave undercut tapered lugs extending beyond the face of the work.

2. In a method of manufacturing a brake actuating nut for coaster brakes from extruded stock having four equally spaced external ribs, the steps of turning a taper on the ribs, drilling and counterboring one end, turning an internal recess in the counterbored portion, milling wedge surfaces on the sides of two diametrically arranged ribs to form wedge lugs, milling off the other two ribs for a portion of their length to form locking lugs with radial shoulders, and facing off the work to the inner edge of the recess to leave the undercut wedge lugs extending from the end of the piece.

3. In a method of manufacturing brake control members for hub brakes, the steps of drilling and counterboring a cylindrical bar of extruded stock having quadrantally arranged longitudinal ribs, turning a taper on the ribs, milling off the sides of two oppositely arranged ribs to form wedges, and milling the remaining ribs to length to form retaining shoulders at their ends.

4. In a method of manufacturing brake control members for hub brakes, the steps of drilling and counterboring a cylindrical bar of extruded stock having quadrantally arranged longitudinal ribs, turning a taper on the ends of the ribs, cutting off, milling off the sides of the two oppositely arranged ribs to form wedges, milling the remaining ribs to length to form retaining shoulders at their ends, and milling clutch teeth in the cut-off end of the part.

STANLEY B. KURZINA, Jr.